(12) United States Patent
Jim et al.

(10) Patent No.: US 6,981,148 B1
(45) Date of Patent: Dec. 27, 2005

(54) METHOD FOR INTEGRATING ONLINE AND OFFLINE CRYPTOGRAPHIC SIGNATURES AND PROVIDING SECURE REVOCATION

(75) Inventors: Trevor Jim, Princeton, NJ (US); Carl A. Gunter, Philadelphia, PA (US)

(73) Assignee: University of Pennsylvania, Philadelphia, PA (US)

(*) Notice: Subject to any disclaimer, the term of this patent is extended or adjusted under 35 U.S.C. 154(b) by 0 days.

(21) Appl. No.: 09/561,806

(22) Filed: Apr. 29, 2000

Related U.S. Application Data

(60) Provisional application No. 60/131,937, filed on Apr. 30, 1999.

(51) Int. Cl.[7] .............................................. H04L 9/00
(52) U.S. Cl. ................... 713/175; 713/156; 713/157; 713/158; 713/168; 713/173; 713/175; 713/176; 707/3; 707/9
(58) Field of Search ....................... 713/175, 156–158, 713/155, 168, 173, 176; 705/50–80, 1; 707/3, 707/9

(56) References Cited

U.S. PATENT DOCUMENTS

| | | | | |
|---|---|---|---|---|
| 5,016,274 | A | * | 5/1991 | Micali et al. ................. 705/66 |
| 5,960,083 | A | * | 9/1999 | Micali ........................ 713/175 |
| 6,035,402 | A | * | 3/2000 | Vaeth et al. ................. 713/201 |
| 6,134,658 | A | * | 10/2000 | Multerer et al. ............ 713/175 |
| 6,202,157 | B1 | * | 3/2001 | Brownlie et al. ........... 713/201 |
| 6,212,640 | B1 | * | 4/2001 | Abdelnur et al. ........... 713/201 |
| 6,247,127 | B1 | * | 6/2001 | Vandergeest ................ 713/100 |
| 6,292,893 | B1 | * | 9/2001 | Micali ........................ 713/158 |
| 6,308,277 | B1 | * | 10/2001 | Vaeth et al. ................. 713/201 |
| 6,321,333 | B1 | * | 11/2001 | Murray ....................... 713/156 |
| 6,353,886 | B1 | * | 3/2002 | Howard et al. ............. 713/156 |
| 6,430,688 | B1 | * | 8/2002 | Kohl et al. ................. 713/156 |
| 6,446,206 | B1 | * | 9/2002 | Feldbaum .................. 713/175 |
| 6,564,320 | B1 | * | 5/2003 | de Silva et al. ............ 713/156 |

OTHER PUBLICATIONS

Gunter et al. Policy-directed certificate retrieval, John Wiley & Sons, Ltd. 2000.*

* cited by examiner

*Primary Examiner*—Kim Vu
*Assistant Examiner*—Beemnet W Dada
(74) *Attorney, Agent, or Firm*—RatnerPrestia

(57) ABSTRACT

A verification method and system including a verifier which can both interpret policies and determine if they are satisfied, and request and obtain relevant certificates. This new architecture includes a verifier which itself can both direct a retrieval mechanism and use a local database of information. Users and applications can obtain and supply certificates to the verifier and the local database. The verifier may invoke a retrieval mechanism to obtain necessary certificates from other authenticated data servers and store them in a secondary database. The flexibility to allow for both on-line and off-line authenticated data server responses for verification is encompassed, as is an enhanced system for security including revocation of certificates using a polarity discipline, which allows data used for revocation to be handled with the same system used for other verification data without imperiling security.

9 Claims, 6 Drawing Sheets

| | | | |
|---|---|---|---|
| Keys | $K$ | $\in$ | Key |
| Constants | $c$ | $\in$ | Key $\cup$ Num $\cup$ Str $\cup$ Bool |
| Positive variables | $x^+$ | $\in$ | $\text{Var}^+$ |
| Negative variables | $x^-$ | $\in$ | $\text{Var}^-$ |
| Positive names | $u^+$ | $\in$ | $\text{Name}^+$ |
| Negative names | $u^-$ | $\in$ | $\text{Name}^-$ |
| Variables | $x$ | ::= | $x^+ \mid x^-$ |
| Names | $u$ | ::= | $u^+ \mid u^-$ |
| Polarities | $\gamma$ | ::= | $+ \mid -$ |
| Expressions | $e$ | ::= | |
| | | | $x \mid c \mid$ |
| Qualified names | | | $e\$u \mid$ |
| Enumerated sets | | | $\{e,\ldots,e\} \mid$ |
| Tuples | | | $(e,\ldots,e) \mid$ |
| Set union | | | $\bigcup e \mid$ |
| Comprehensions | | | $\{e \mid g,\ldots,g\} \mid$ |
| Evaluate at | | | $(e@e) \mid$ |
| Co-finite sets | | | $\text{cmpl}\{w,\ldots,w\}$ |
| Values | $v$ | ::= | $c \mid (v,\ldots,v) \mid$ $\{v,\ldots,v\} \mid$ $\text{cmpl}\{w,\ldots,w\}$ |
| Comparable values | $w$ | ::= | $c \mid (w,\ldots,w)$ |
| | $g$ | ::= | |
| Generators | | | $p \in e \mid$ |
| Guards | | | $e = e \mid$ |
| | | | $e \neq e \mid$ |
| | | | $e \notin e$ |
| Patterns | $p$ | ::= | $x \mid (x,\ldots,x)$ |
| Definitions | $d$ | ::= | $u = e$ |
| Programs | $P$ | ::= | $d_1,\ldots,d_n$ |

Fig. 4

Variables: $[x]\rho = \rho(x)$

Constants: Constants are given their usual interpretation. For instance $[2]\rho$ is the number 2 viewed as an element of the [Num] part of $U$. Principals $K$ take their meanings in the [Key] part of the domain.

Qualified Names: $[e\$u]\rho = \rho([e]\rho, u)$. Note that the conventions about definition mean that the meaning of $e\$u$ with respect to environment $\rho$ is given by the expression on the right if $[e]\rho$ is defined and is a principal; it is undefined otherwise. Also, our restriction on environments implies that the meaning of $e\$u$ is a set if it is defined.

Evaluate At: $[e_1@e_2]\rho = [e_1]\rho$ provided $[e_2]\rho \in$ [Key]; otherwise $[e_1@e_2]\rho$ is undefined.

Enumerated Sets: $[\{e_1, \ldots, e_n\}]\rho = \{[e_1]\rho, \ldots, [e_n]\rho\}$.

Co-finite Sets: $[\text{cmpl}\{w_1, \ldots, w_n\}]\rho = U - \{[w_1]\rho, \ldots, [w_n]\rho\}$.
  Notice here that the complement is taken with respect to $U$, not $C$.

Tuples: $[(e_1, \ldots, e_n)]\rho = ([e_1]\rho, \ldots, [e_n]\rho)$.

Set Unions: $[\bigcup e]\rho = \{\nu \mid \nu \in \nu'$ for some $\nu' \in [e]\rho\}$.

Is an Element of: $[\{e_1 \mid x \in e_2, g\}]\rho = \bigcup_{\nu \in [e_2]\rho}[\{e_1 \mid g\}]\rho[x \mapsto \nu]$ Is a Pattern in: $[\{e_1 \mid (x) \in e_2, g\}]\rho = \bigcup_{(\nu) \in [e_2]\rho}[\{e_1 \mid g\}]\rho'$
  where $\rho' = \rho[x \mapsto \nu]$.

Is Equal to: $[\{e_1 \mid e_2 = e_3, g\}]\rho = [\{e_1 \mid g\}]\rho$ provided $[e_2]\rho = \nu_2$ and $[e_3]\rho = \nu_3$ are equal and both are elements of $C$. If they are both in $C$ but they are not equal then the meaning of the expression is the empty set $\{\}$. If either of them is undefined or not in $C$ then the meaning is undefined.

Is not Equal to: $[\{e_1 \mid e_2 \neq e_3, g\}]\rho = [\{e_1 \mid g\}]\rho$ provided $[e_2]\rho = \nu_2$ and $[e_3]\rho = \nu_3$ are unequal and both are elements of $C$. If both are elements of $C$ but they are not equal then the meaning of the expression is the empty set $\{\}$. If either of them is undefined or not in $C$ then the meaning is undefined.

Is not an Element of: $[\{e_1 \mid e_2 \notin e_3, g\}]\rho = [\{e_1 \mid g\}]\rho$ provided $[e_2]\rho = \nu_2$ is in $C$, and $[e_3]\rho$ is a set $\nu_3$ and $\nu_2 \notin \nu_3$. If $\nu_2$ is in $C$ and $\nu_3$ is a set with $\nu_2 \in \nu_3$, then the meaning is the empty set $\{\}$. If $\nu_2$ is not in $C$, or $\nu_3$ is not a set, then the meaning is undefined. Note that $\nu_3$ may contain elements not in $C$.

Base Case: $[\{e \mid \}]\rho = \{[e]\rho\}$.

FIG. 5

$$c : \gamma \qquad \frac{e_1 : \gamma \quad \ldots \quad e_n : \gamma}{(e_1, \ldots, e_n) : \gamma} \qquad \frac{e_1 : \gamma \quad \ldots \quad e_n : \gamma}{\{e_1, \ldots, e_n\} : \gamma} \qquad x^\gamma : \gamma \qquad eSu^\gamma : \gamma \qquad \frac{e : \gamma}{\bigcup e : \gamma}$$

$$\frac{e_1 : \gamma}{(e_1 @ e_2) : \gamma} \qquad \mathrm{cmpl}\{w\} : \gamma \qquad \frac{e : \gamma}{\{e \mid \} : \gamma} \qquad \frac{\{e_1 \mid g\} : \gamma \quad x : \gamma \quad e_2 : \gamma}{\{e_1 \mid x \in e_2, g\} : \gamma} \qquad \frac{\{e_1 \mid g\} : \gamma \quad p : \gamma \quad e_2 : \gamma}{\{e_1 \mid p \in e_2, g\} : \gamma}$$

$$\frac{\{e_1 \mid g\} : \gamma}{\{e_1 \mid e_2 = e_3, g\} : \gamma} \qquad \frac{\{e_1 \mid g\} : \gamma}{\{e_1 \mid e_2 \neq e_3, g\} : \gamma} \qquad \frac{\{e_1 \mid g\} : \gamma \quad e_3 : \neg\gamma}{\{e_1 \mid e_2 \not\subseteq e_3, g\} : \gamma}$$

Fig. 6

METHOD FOR INTEGRATING ONLINE AND OFFLINE CRYPTOGRAPHIC SIGNATURES AND PROVIDING SECURE REVOCATION

This application claims priority from Provisional Application No. 60/131,937 filed Apr. 30, 1999.

TECHNICAL FIELD

The present invention relates generally to secured communications and, more particularly, to a scheme for increasing the efficiency of policy checking for verifying data.

BACKGROUND OF THE INVENTION

In order to verify and certify the origin of certain data, a system may be used in which users have public keys which must be certified in order to provide security. This type of system, a public key infrastructure (PKI), relies on certification of public keys.

In such a public key (or "asymmetric") scheme, each user has a private key and a public key. The user can use the private key to compute a signature for a given message. Upon receipt of a signed message, the recipient can use the public key for the purported sender to determine whether the message was, indeed, signed using the sender's private key. Security is maintained because the private key can not be determined using the public key; therefore by keeping the private key private and disseminating the public key widely, the user will have the advantages of security and wide verifiability of signatures.

However, the system will not work unless it can be clearly ascertained that the public key the recipient associates with a particular sender is actually that sender's public key. For example, if a message arrives that is purportedly from Alice but is actually from an impostor, the recipient will not know that it is not from Alice if the public key that the recipient believes to be Alice's is actually one for which the impostor has the private key.

This system also works in reverse—a message may be sent to a recipient encrypted using the recipient's public key. The decryption can be accomplished only with the private key, and again, it is therefore important to ensure that the proper public key is being used, or an impostor may be able to intercept and decrypt the communication.

In order to control for this, certificates are issued (and revoked) by a authenticated data server. The authenticated data server contains certificates which are themselves signed using the public key/private key system. The certificates may be stored locally. For example, in prior art FIG. 1, a user 10, running an application 20, may provide the application with certificates, as indicated by the arrow from user 10 to application 20. The application 20 may provide that certificate to verification component (verifier) 30, as indicated by the arrow between them. The verifier 30 may also receive certificates from a local database 40. The database 40 may also receive certificates from the application 20. In order to determine whether needed certificates are available, the verifier 30 must be able to interpret a policy, received from the user 10 or application 20, which determines which certificates will be used. If the right certificates are not available locally, the user 10 must then attempt to retrieve them over network 70 from remote database 60 via the retrieval component 50. A few applications 20 may be smart enough to retrieve missing certificates without user intervention, but these are not widespread.

The problem with the prior art system is that there is duplication of two kinds: between the verifier 30 and the application 20 and between different applications 20. In order to see how there can be duplication between the verifier 30 and the application 20, suppose application 20 is an email application using the PGP system (PGP stands for "Pretty Good Privacy" and is described in P. Zimmerman, *The Official PGP User's Guide*, MIT Press 1995). If the email application is being used to send an encrypted message to Bob, and the policy is to "rely on either Alice or Trent for key bindings" the email application will invoke the verifier 30, which will examine the policy and look for a certificate for Bob signed by Alice or Trent in the local database 40 or for other information which could verify Bob's key (for example, a certificate signed by Alice which allows Eve to provide key bindings in her stead, and a certificate signed by Eve which can verify Bob's key.) If no such certificate is found, it reports failure to the email application. If the email application were "smart" it would examine the policy to determine what certificates are needed from remote database 60, and therefore which query to send to retrieval component 50. If email application is not this advanced, it may be left to the user 10 to request the necessary certificates. In this case, both the verifier 30 and the application 20 or user 10 are examining the policy. In the case of the smart application 20, the logic for understanding policies is duplicated in the verifier 30 and the application 20, and that it will be executed not once or even twice, but three times: once for the failed verification, a second time by the application 20 to formulate the query to the retrieval component 50 or the user, and a final time by the verifier when the application submits the retrieved certificates for approval.

Another sort of duplication exists between different applications. An application that wants to have automated certificate retrieval may not be able to use the retrieval mechanism of an existing second application. The code in the second application may be proprietary or specific to that application, or the writer of the first application may not trust the writers of the second system. Policy languages and verifiers of prior art systems (such as PolicyMaker (described in M. Blaze et al., "Decentralized Trust Management", *Proceedings of the 17th Symposium on Security and Privacy*, pp. 164–173 IEEE Computer Society Press, 1996) and SPKI/SDSI (described in C. M. Ellison et al., "SPKI Certificate Theory" available at <http://ietf.org/rfc/rfc2693.txt?number=2693>)) were made as general as possible in order to eliminate this sort of duplication in policy language interpretation and verification. However, it has not been eliminated for policy-directed retrieval.

In order to provide policy-directed certificate retrieval, the prior art verifier 30 receives responses to its query from the remote database 60 over the network 70 in a format which includes the query or a hash of the query. This requires the remote database 60 and related remote system (not pictured) to be on-line (to contain a private key and encryption software) in order to provide security (signing) for the responses sent to the verifier 30. This is a clear security problem, as the remote database 60 is attached to the network 70, and therefore vulnerable to unauthorized access. Off-line signing solves the security problem, however the flexibility of the system is limited and storage needs at the remote database 60 may be increased.

Additionally, prior art retrieval devices provide revocation capabilities. This is useful in order to revoke the validity of information that has already been sent out into the distributed secure system. The prior art method of ensuring that information relied upon has not been revoked is to establish a separate protocol which is invoked in order to find out if issued certificates have been revoked. Attempts have also been made to provide revocation by providing certificates which indicate non-membership. (Described in Moni Naor and Kobbi Nissim, "Certificate Revocation and certificate update", 7$^{th}$ USENIX Security Symposium, 1998.) If not used properly, this can cause security loopholes. An adversary can collect certificates and present contradictory certificates in order to overcome security restrictions. For example, if a certificate indicates that Ann is a member of the group students, and school individuals has been defined as a group consisting of the combinations of subgroups teachers, administrators and students, then Ann may be able to receive a certificate verifying that Ann is a member of the group school individuals. However, if school employees has been defined as the group consisting of those in the group school individuals who are not in the group students, and Ann graduates or leaves the school and can obtain a certificate indicating that she is no longer in the group students, then she may be able to present herself as a school employee even though she is not. To do this, she could present that certificate ("Ann is not a student") and her earlier certificate ("Ann is a school individual") and may qualify as a school employee, as she can show that she satisfies the definition. This is clearly a security loophole—an adversary may collect different certificates and present them in ways which allow revocation certificates to be used to overcome security restrictions.

It is clear that certificates will be used by more and more applications in the coming years. For example, consider the documents involved in pre-approval of a mortgage. Today, these documents are passed along by mail, fax, computer network, orally (over the telephone), through personal contact, and so on. The authentication of documents generally relies on letterheads and the security of communication channels like the telephone or personal meetings. The person requesting the mortgage and the one granting it would like to come to mutual agreement. This agreement involves information transfer, which could be verified by a security system. In addition to provision of security for these transactions, a system which can integrate security and the organization of the data flow and requests would be a significant improvement over the prior art.

SUMMARY OF THE INVENTION

It is, therefore, an object of the invention to provide a secure system that eliminates duplication in policy interpretation between applications or between an application and verifier and allows for on-line and off-line verification by the remote server.

It is a further object of the invention to provide a secure system which allows for revocation of certificates without introducing security loopholes which may allow revocation certificates to be used to frustrate security policies.

The above objects are met by the present invention which encompasses a verification method and system including a verifier which can both interpret policies and determine if they are satisfied, and request and obtain relevant certificates. This new architecture includes a verifier which itself can both direct a retrieval mechanism and use a local database. As with the prior art architecture, users and applications can obtain and supply certificates to the verifier and the local database, and the verifier may invoke a retrieval mechanism to obtain necessary certificates from other authenticated data servers and store them in a secondary database. The invention also encompasses the flexibility to allow for both on-line and off-line authenticated data server responses for verification, and an enhanced system for security including revocation of certificates using a polarity discipline, which allows data used for revocation to be handled with the same system used for other verification data without imperiling security.

BRIEF DESCRIPTION OF THE DRAWINGS

FIG. 4 is a table of the internal language according to the present invention.

FIG. 5 is a table of the clauses of the internal language according to the present invention.

FIG. 6 is a table of the polarity rules for the internal language according to the present invention.

DETAILED DESCRIPTION OF THE PREFERRED EMBODIMENTS

In the preferred embodiment, the system according to the present invention, QCM (Query Certificate Manager) utilizes a language in which queries can be presented to QCM by an application. QCM is a language based upon the language of sets. In the preferred embodiment, users of QCM write programs in a higher-level language (the external language) which is translated into the QCM internal language in which the programs (security policies) are decomposed and optimized.

Figure 1:
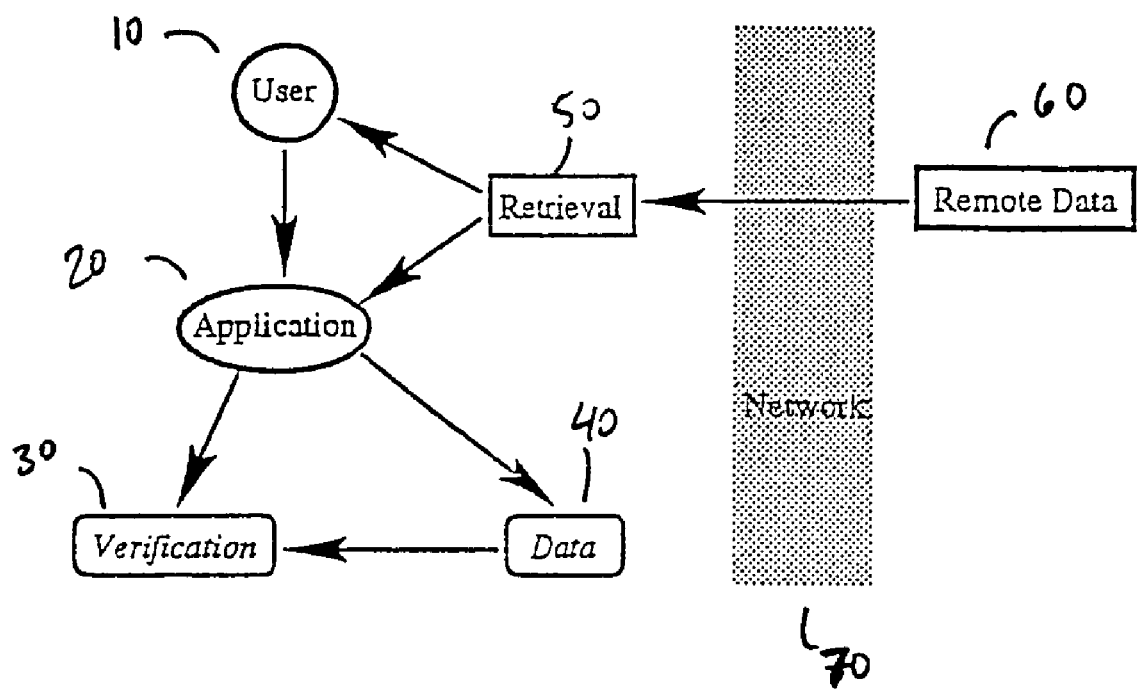
FIG. 1 is a block functional and data flow diagram for a prior art security architecture.
Figure 2:
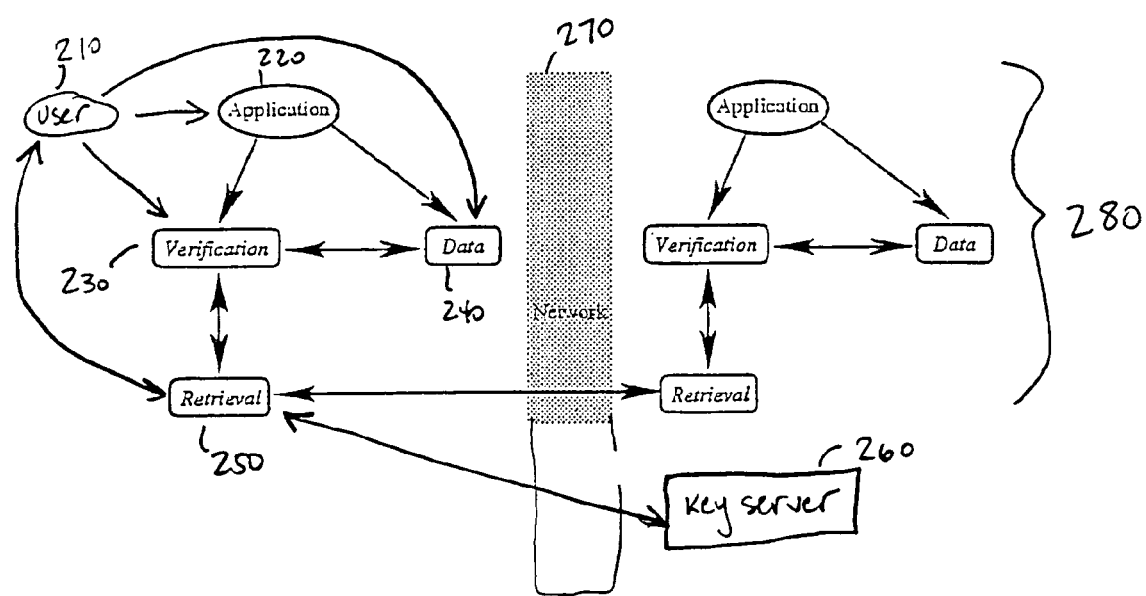
FIG. 2 is a block functional and data flow diagram for a security architecture according to the present invention.

FIG. 2 shows how retrieval in the QCM verifier system can be accomplished. The user 210 or application 220 can send certificates to the QCM verifier 230 or to a local database 240. The QCM verifier 230 also has access to a retrieval mechanism 250, which can communicate over the network 270 to an authenticated data server 260. Other applications with retrieval mechanisms 280 can also act as authenticated data servers in accordance with the method and system of this invention. In a preferred embodiment, the network 270 is the Internet.

In one embodiment the syntax of the QCM language is based upon set language, and is similar to that of SPKI and other prior art systems. In another embodiment it is based on XML markup language, standardized by the W3 Consortium <http://www.w3.org>. When the QCM verifier 230 is asked to evaluate a policy using the certificates available to it, a successful evaluation results in the data needed or a positive indication of success. If not, the expression will evaluate to something else. In the preferred embodiment, the result which indicates that the certificates available are not sufficient is the empty set.

If the QCM verifier 230 can not find the appropriate certificate, it may send a query to the authenticated data server 260. The query will be optimized to produce a smaller rather than a larger reply from the authenticated data server. For example, if the certificate being sought is one for Alice's public key, the query can ask for all certificates regarding all keys resident in the authenticated data server. However, a query directed toward all certificates for Alice's public key will be used by the QCM verifier 230. The responses from the authenticated data server 260 are signed. This response is then used by the QCM verifier 230 to determine the public key being sought.

In order to allow for flexibility in authenticated data server security, the authenticated data server 260 may produce either an on-line or off-line answer. An on-line answer is produced if the authenticated data server 260 contains a private key and the ability to sign its responses using that private key. On-line responses can be direct replies. Direct replies will contain the answer to the question posed to the authenticated data server 260, the identity of the authenticated data server 260, and the query or a hash of it (in order to ensure that the response is valid for the query given). Because the authenticated data server does not know in advance what queries it will receive, it could not have prepared the certificate in advance. This is why that the private key has to be online and available to the authenticated data server 260, and the authenticated data server 260 has to sign each certificate dynamically.

QCM also has an offline signing mode, in which the authenticated data server 260 contains a number of presigned certificates indicating that a certain key is associated with a certain user or containing other verification information. Instead of returning a response including the query sent, the QCM verifier 230 would evaluate the query, keep track of which presigned certificate(s) would be useful in producing an answer, and return that certificate (or those certificates) as a response. The requesting verifier would then need to evaluate the query using the certificate(s) returned in order to get data requested. This will require more processing time than the evaluation of a direct reply, but the authenticated data server 260 need not have signing capability, but need only have the capability to evaluate queries and transmit relevant certificates.

The data to be verified can be key bindings, access control information, or any other data for which verification is necessary. By way of illustration, the preferred embodiment will be described with reference to a system for responding to requests for a user's public key, or for verification that a particular user is associated with a particular public key. If the authenticated data server 260 contains information that can associate the user with the key, a yes answer verifying the association (or a certificate which would enable the verifier to evaluate the query to verify the association) would be returned from the authenticated data server 260. If no such verification can be made, the query will evaluate to the empty set, indicating not necessarily that the identification of user to key is unsound, but rather that no such association could be positively confirmed.

In order to secure communications with an authenticated data server 260, the QCM verifier 230 will use the public key of that server and all responses from the server should be signed by the server's private key. In the preferred embodiment, "chains of trust" can be created. The QCM verifier 230 can contain more than one authenticated data server 260 which it will rely upon for secure certificates. This constitutes a chain of trust of length 1, that is, the verifier determines which authenticated data servers it directly trusts. A chain of trust of length 2 can also be used, in which authenticated data servers whose security can be verified by an authenticated data server 260 that the verifier directly trusts can provide certificates used to evaluate queries. Any finite length chain of trust can be used, though in practice, longer chains will be considered less secure.

In a preferred embodiment, a QCM verifier 230 contains a strategy for "pushing" or "pulling" certificates given a query. For example, if a first QCM verifier receives a certificate that it can not use to evaluate a query, but must send a query to a second QCM verifier, should it "push" along the certificate, which might be useful to that second QCM verifier? If the second QCM verifier does not receive data that it needs, it may "pull" the data from the first QCM verifier. A strategy for when to perform such "pushing" and "pulling" should be incorporated in QCM verifiers in a preferred embodiment.

Figure 3:
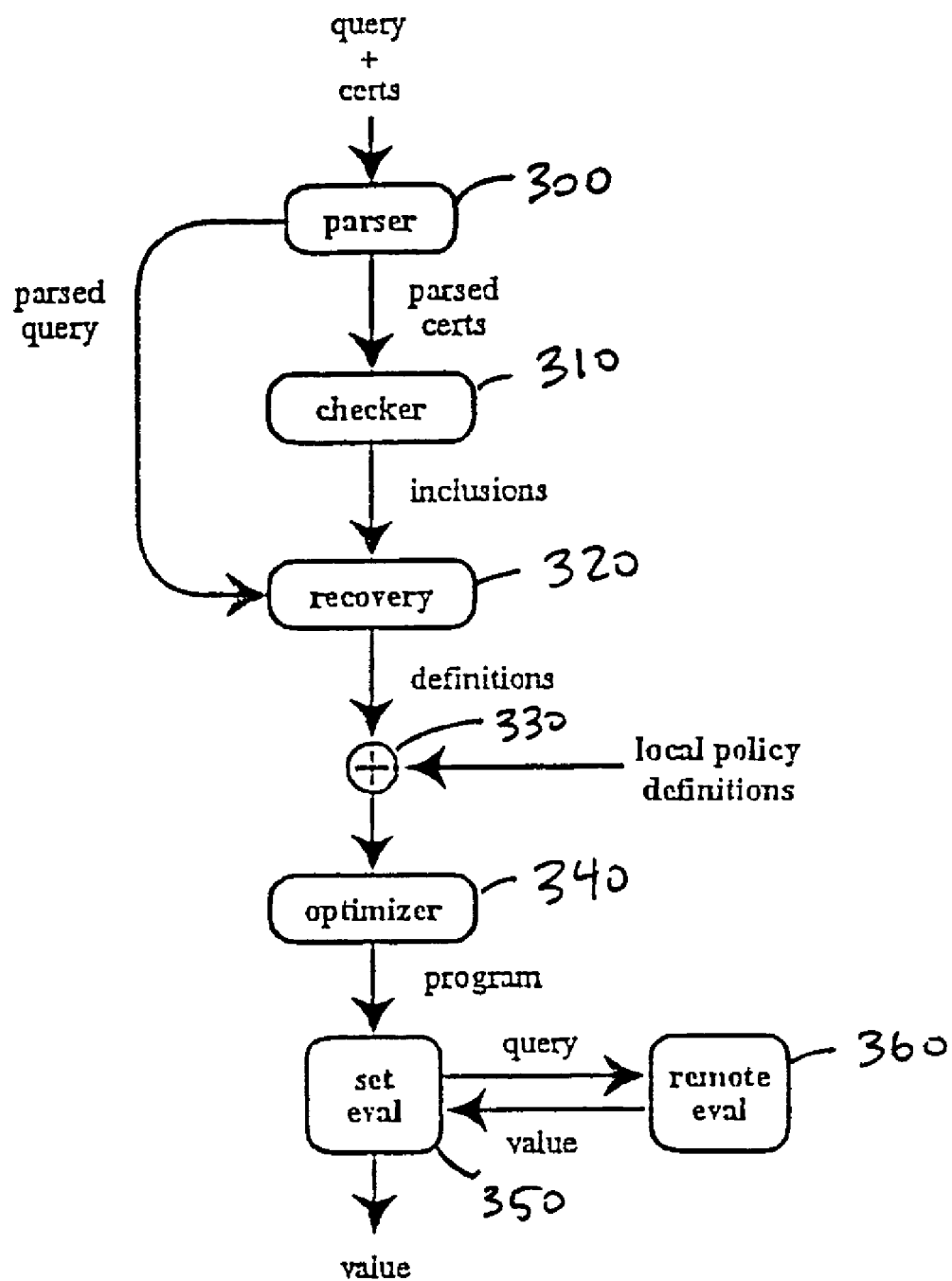
FIG. 3 is a flowchart of the query evaluation according to the present invention.

An application invokes QCM by giving it a query and a set of certificates. This input passes through a number of phases, as shown in FIG. 3. The first phase the input passes through is parsing, 300. The query and certificates are parsed into the QCM verifier's abstract syntax, and the syntax and form of the query is checked.

After parsing 300, the signatures of the parsed certificates are verified and their provenance is checked at step 310, that is, the certificate is checked to ensure that the entity signing is to be trusted on the matter the certificate concerns. The recovery phase 320 uses the output of the checker, the inclusions from the certificates, and the parsed query to form definitions, which are the best form the available data can be arranged in order to simplify the query process. When the definitions are combined with the local policy definitions in the database local to the QCM verifier in step 330, the result is a program, which is passed through an optimizer 340, in order to transform the program into a more efficient program and decide the form of any remote queries that will be sent during the set evaluation phase 350.

The program is then run through a set evaluator which can send queries and receive values from authenticated data servers, in the remote evaluation phase 360. Queries can be sent in parallel for remote evaluation. When the set evaluation phase is completed, a value is returned which is the result of the query.

When the authenticated data server performs online signing, a query simply arrives at the authenticated data server and is sent to a local evaluator, which results in an unsigned value. That value can then be signed and returned across the network. When the authenticated data server can not perform online signing, the query is parsed at the authenticated data server and the value of the query is calculated. However, the value is discarded, and the set of certificates used by the authenticated data server to calculate the value of the query (which certificates have already been signed using the authenticated data server's public key) are returned to the QCM verifier. The QCM verifier can then verify that the certificates were sent by the authenticated data server, and use the certificates to evaluate the query itself as it used the original certificates presented. This will result in the same value achieved at the authenticated data server.

In order to provide for certificate revocation, in a preferred embodiment the internal language of QCM will include both positive variables and negative variables, and positive names and negative names, as shown in FIG. 4. The clauses of QCM's denotational semantics are given in FIG. 5. QCM will also include polarity rules which will govern operations including the polarized variables and names, and allow for both positive and negative certificates. These rules are given in the table in FIG. 6.

A positive certificate would include positive information about the system, for example "V certifies that $K_A$ is Ann's public key" or "V certifies that Ann may use resource X." A negative certificate would denote negative information about the system, for example "V certifies that the certificate with serial number 315' has been revoked." "V certifies that Ann's permission to use resource X has been revoked." Because of the structure of QCM and the differing treatment of positive and negative certificates, the language has the monotonicity property. Thus, the present invention avoids the prior art security loophole which allows an adversary to present only certain certificates thus foil a security measure while still allowing for revocation. Because both positive and negative certificates are handled by the same internal system, complexity and processing time are cut down.

The security aspects of this invention can be combined with other, broader functionality. For example, in the mortgage application example previously discussed, secure information must be transferred, which could be verified by certificates (for example, the mortgage application can be signed). However, there may be other situations in which an extension of the QCM system can be used both to verify and to guide the process. For example, the potential mortgage grantor would like a secure response to credit report inquiries and bank account queries. The credit agency and applicant's bank will require applicant's permission before disclosing this information. The QCM system can be used to allow the credit agency and bank to send the information securely after querying the applicant for permission for a particular potential mortgage grantor to receive the information. The same push and pull of certificates for security can be used to provide the applicant with requests, or, to provide for information if the applicant has pre-approved of requests for the applicant's permission to disclose the information. Both the security of information and the flow of information can be structured by the use of the QCM system in this extended functionality.

We claim:

1. A method for providing verification information to a requesting application by an authenticated server comprising the steps of:
   generating pre-signed certificates at an authenticated server;
   receiving a query for verification information from a requesting application after the pre-signed certificates are generated;
   examining policies for verification and available certificates and computing a query response to said query; and
   determining whether to give an on-line or an off-line response, the on-line response being determined if the authenticated server is able to sign its responses and the off-line response being determined if the authenticated server is unable to sign its responses; and
   if an off-line response is to be given, computing which of the pre-signed certificates to return to said requesting application and returning the pre-signed certificates computed for return to said requesting application;
   if an on-line response is to be given, returning an on-line response comprising said query response and information identifying said query.

2. The method of claim 1, where said step of receiving a query for verification information from a requesting application comprises the step of receiving information over a distributed computer network; and said steps of returning the pre-signed certificates to said requesting application and of returning an on-line response comprising said query response and said query comprise the step of returning information over said distributed computer network.

3. The method of claim 2, where said distributed computer network is the Internet.

4. The method of claim 1, said step of examining a policy for verification and available certificates and computing a query response to said query; and further comprising the step of:
   determining whether verification information should be requested from one or more other authenticated data servers, and, if verification information should be requested, sending requests for verification information to said one or more other authenticated data servers.

5. The method of claim 1, wherein said step of computing which of the pre-signed certificates to return comprises the step of:
   determining which of said examined certificates were used to compute said query response.

6. The method of claim 1, wherein said steps of computing which of the pre-signed certificates to return and returning the pre-signed certificates computed for return if an off-line response is to be given comprises the steps of:
   determining which of said examined certificates were used to compute said query response; and
   returning, to said requesting application, pre-signed certificates corresponding to the determined certificates used to compute said query response.

7. The method of claim 1, further comprising the step of:
   computing, at said requesting application, a query response to said query from the computed pre-signed certificates if the pre-signed certificates computed for return to said requesting application are returned to said requesting application.

8. A method for providing verification information to a requesting application by an authenticated server comprising the steps of:
   programming a first server to receive a query for verification information from a requesting application;
   programming said first server to examine first server policies for verification and first server available certificates and computing a query response to said query;
   programming said first server to determine whether said query necessitates a remote query to a second server, and, if so, to send said remote query to said second server;
   programming said second server to generate pre-signed certificates, said pre-signed certificates generated before said remote query is received by said second server;
   programming said second server to examine said remote query, second server policies for verification, second server available certificates and computing a remote query response to said remote query;
   programming said second server to determine whether to give an on-line or an off-line response, the on-line response being determined if the authenticated server is able to sign its responses and the off-line response being determined if the authenticated server is unable to sign its responses; and
   if an off-line response is to be given, computing which of the pre-signed certificates to return to said first server and returning to said first server the pre-signed certificates computed for return;
   if an on-line response is to be given, returning to said first server an on-line response comprising said query response and information identifying said query;
   programming said first server to receive responses from said second server and to determine whether an on-line or an off-line response was given to a remote query;

programming said first server to respond to receipt of an off-line response to a remote query by examining said first server policies for verification and said first server available certificates and said off-line response and computing a first server remote query response to said remote query;

programming said first server to use said first server remote responses, said on-line responses, said first server policies for verification and said first server available certificates to compute a query response to said query for verification information;

programming said first server to send said query response to said query for verification information to said requesting application.

9. The method of claim 8, where said query, said first and second server policies for verification, said first and second server available certificates, said remote query, said first server remote query responses, and said on-line or off-line response are expressed using a programming language which includes two syntactically distinct classes of names and variables, one of said classes expressing positive information, and the second of said classes negative information.

* * * * *